United States Patent [19]

Granberry

[11] 4,444,301

[45] Apr. 24, 1984

[54] MOUNTING SYSTEM FOR CONVEYOR IDLERS

[76] Inventor: Roger A. Granberry, 2106 Sherwood Dr., Valparaiso, Ind. 46383

[21] Appl. No.: 222,020

[22] Filed: Jan. 2, 1981

[51] Int. Cl.³ ...................... B65G 39/02; F16B 37/00
[52] U.S. Cl. .................................. 193/35 R; 411/410; 411/427
[58] Field of Search .................. 193/35 R, 37; 403/4, 403/26; 411/427, 402, 410, 910

[56] References Cited

U.S. PATENT DOCUMENTS

| | | | |
|---|---|---|---|
| 1,933,007 | 10/1933 | Dieter | 411/427 |
| 3,416,638 | 12/1968 | Buck | 193/35 R |
| 3,890,755 | 6/1975 | Specht | 193/35 R X |
| 4,311,226 | 1/1982 | Thompson | 193/37 X |

FOREIGN PATENT DOCUMENTS 418914 11/1934 United Kingdom ................ 411/427

OTHER PUBLICATIONS

Stephens–Adams, Inc. Catalog No. 572

Primary Examiner—Jeffrey V. Nase
Attorney, Agent, or Firm—Hill, Van Santen, Steadman & Simpson

[57] ABSTRACT

A mounting system for conveyor idlers incorporates an assembly nut having a plurality of different pairs of parallel faces spaced around the periphery of the nut, such faces being spaced apart by different distances to allow use of the mounting system with a plurality of different styles of mounting brackets.

10 Claims, 8 Drawing Figures

MOUNTING SYSTEM FOR CONVEYOR IDLERS

BACKGROUND OF THE INVENTION

1. Field of the Invention

The present invention relates to a mounting system for conveyor idlers, and more particularly to a system which allows operative cooperation between a standard conveyor idler, and a variety of different mounting brackets.

2. The Prior Art

Belt conveyors are used for transporting many different kinds of materials, and it is conventional to support such belt conveyors with a multiplicity of idler rollers, spaced apart along the length of the conveyor. The idler rollers support the belt, and the material supported thereon, and roll freely to allow the conveyor to transport the material with minimum friction.

Idler rollers are commercially available from a number of different manufacturers, but the differences in size and shape among such idler rollers, and the brackets which support them relative to the ground or floor below the conveyor, has made it necessary to have a supply of idler rollers for each different kind of bracket which is employed at a given site, in order to permit quick maintenance and/or repair, with a minimum down time of the conveyor.

Attempts have been made in the past to provide a mounting mechanism which allows certain idler rollers to be used with brackets for which they were not designed, but the success of these attempts has been relatively limited, and provide a variety of different components which must be kept in inventory by a conveyor operator who employs conveyors using mounting brackets supplied by different manufacturers. In addition, the previous attempts to provide for flexibility in adapting idler rollers to different bracket configurations have been relatively inflexible in the amount of leeway which can be given to position and placement of the mounting brackets relative to the idler rollers, and have generally not allowed for the use of idler rollers having preloaded roller bearings.

SUMMARY OF THE PRESENT INVENTION

It is a principle object of the present invention to provide a mounting system for conveyor idlers which overcomes for disadvantages listed above.

It is a particular object of the present invention to provide a mounting system for idler rollers in which a wide variety of mounting brackets can be accommodated with a single idler roller configuration, and in which there is provided a flexibility in the placement of the mounting brackets relative to the conveyor, and provision for preloading roller bearings within the idler rollers.

In one embodiment of the present invention, the above advantages are achieved by the use of an assembly nut adapted to be maintained in place by a threadable connection with the shaft on which the idler roller is mounted, and which is adapted to preload the bearings of such idler roller with a force operating in the axial direction. The head of the nut is adapted to be received in a notch within a mounting bracket, and the head is provided with plural pairs of parallel walls which are spaced apart by a plurality of discrete distances, so as to be tightly received in a plurality of slots of different width, one for each of a plurality of different angular orientations of the nut.

These and other objects and advantages of the present invention will become manifest by an examination of the following description and the accompanying drawings.

BRIEF DESCRIPTION OF THE DRAWINGS

Reference will now be made to the accompanying drawings in which.

DESCRIPTION OF THE PREFERRED EMBODIMENTS

Figure 1:
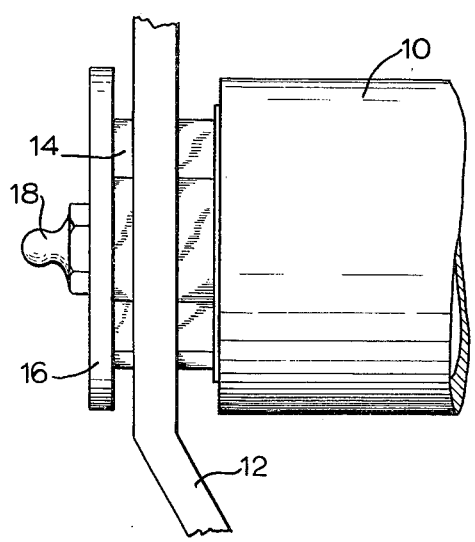
FIG. 1 is a fragmentary elevational view of an idler mounting system incorporating an illustrative embodiment of the present invention.

Referring now to FIG. 1, a fragmentary elevational view of an idler roller 10 is illustrated, the idler roller being supported by a bracket 12. The bracket 12 constitutes a generally vertically upstanding wall, having a thickness illustrated in FIG. 1. An aperature in the bracket 12 receives an assembly nut 14 which is fixed to the roller 10, and the roller 10 is thereby supported by the bracket 12. Bearings are provided for allowing the roller 10 to rotate relative to the assembly nut 14. A retainer plate 16 is mounted at the outer end of the nut 14, and constitutes a flange which prevents the nut 14 from being withdrawn from its aperture in the support 12. A grease fitting 18 is provided at the outside of the retainer plate 16.

Figure 2:
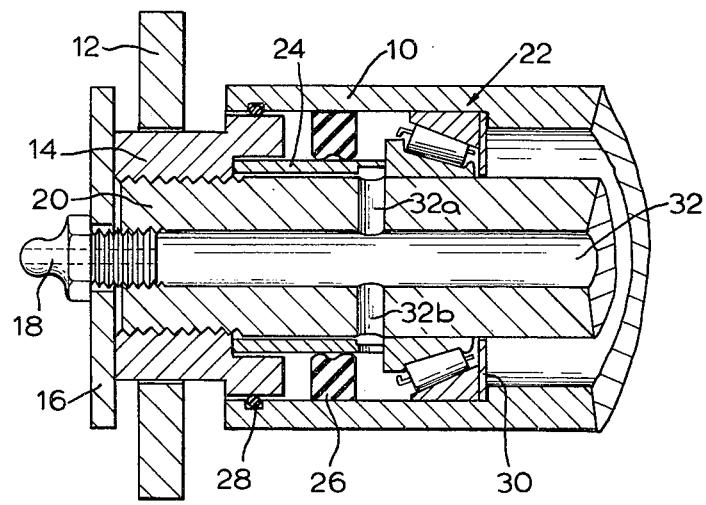
FIG. 2 is a cross-sectional view of part of the apparatus illustrated in FIG. 1.

FIG. 2 illustrates a cross-sectional view of the apparatus of FIG. 1, with the bracket in section. As shown in FIG. 2, the assembly nut 14 is threaded onto the end of a shaft 20 which extends all the way through the central portion of the roller 10. The shaft 20 supports the inside race of a roller bearing assembly 22, and the roller 10 is supported on the outer race of this assembly. The roller bearing assembly is preloaded by stress in an axial direction by tightening the nut 14 on the shaft 20, which urges a sleeve 24 and the inner race of the bearing assembly 22 rightwardly, shown in FIG. 2. The grease seal 26 surrounds the sleeve 24 and an O-ring 28 is provided between the nut 14 and the roller 10 to serve as a dust seal. A washer 30 surrounds the shaft 20 at the interior side of the bearing assembly 22 to serve as a grease retainer.

The shaft 20 has a central aperture 32 which extends for its entire length, and which is closed at its outer end by the grease fitting 18. The bearing assembly 22 is lubricated by lubricant which flows through the central bore 32 of the shaft 20, and is admitted into the vicinity of the bearing by bores 32a and 32b leading from the central bore 32 to the space between the seal 26 and the grease retainer 30.

Both ends of the roller 10 are identical to that shown in FIG. 2. The bearings on both ends of the roller may be lubricated from either end by admitting lubricant to the central bore 32. When two or more rollers are positioned generally end-to-end, as in troughing conveyor, the grease fittings 18 between adjacent rollers are removed and replaced by a connector and a conduit to allow lubricant to flow from the central bore 32 of one roller shaft to the next. In this event the connector has a flange for maintaining the retainer plate in assembled condition.

Figure 3:
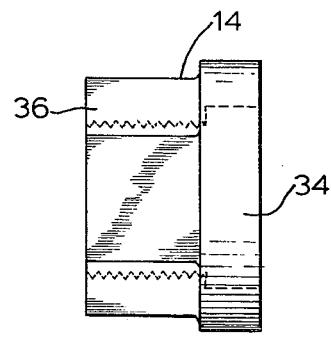
FIGS. 3 and 4 are respectively a side elevational view and an end view of the assembly nut illustrated in FIGS. 1 and 2, and FIGS. 5a–5d are illustrations of a variety of support apertures of various sizes and shapes with which the present invention cooperates.
Figure 4:
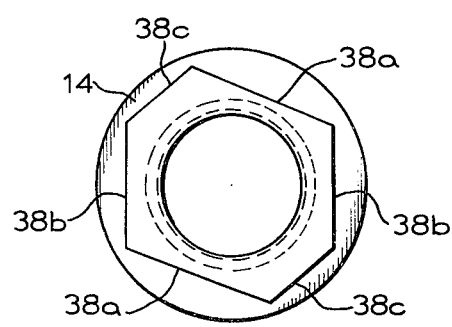
Figure 5A:
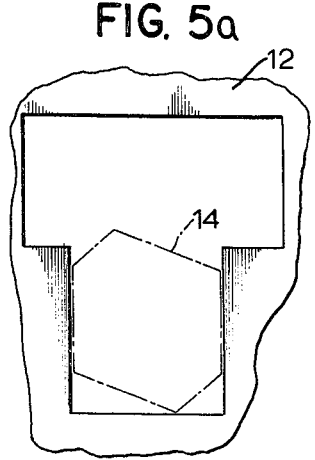
Figure 5B:
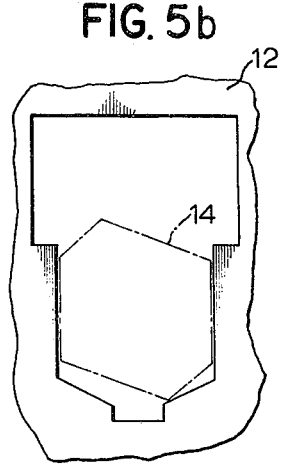
Figure 5C:
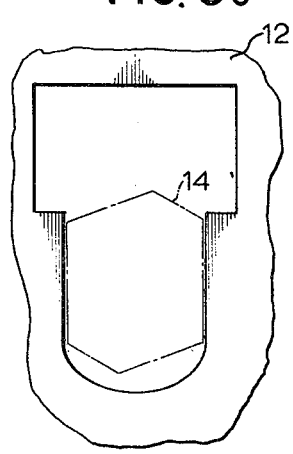
Figure 5D:
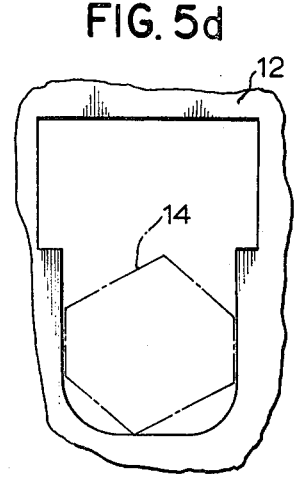

FIGS. 3 and 4 illustrate side and end views of the assembly nut 14. The nut has an inner portion 34 which is a circular cylindrical surface, and an outer portion 36 which has three pairs of flat parallel opposing faces, each of which makes an angle of 120° with the adjacent faces on either side. Each pair of the faces has a different length however, with a result that the spacing between the faces of each pair is different. The parallel faces 38a have the longest length, and are spaced the closest together, as illustrated in FIG. 4. The faces 38c have the shortest length, and are spaced the furthest apart. The faces 38b have an intermediate length and an intermediate spacing.

Because of the different spacing of each of the three pairs of faces, the nut 14 may be mounted in assembly with mounting brackets having a variety of different width slots. FIGS. 5a–5d illustrate the variety of sizes and shapes of slots found in the mounting brackets of various manufacturers. It has been found that the three different spacings provided by the assembly nut of the present invention allows the idler rollers of FIGS. 1 and 2 to be mounted with nearly all of the presently commercially available mounting brackets. Therefore, with the use of the present invention, it is not necessary to maintain an inventory of a variety of different idler rollers to fit the various supporting hardware which may be in use. Instead, a smaller inventory of replacement idler rollers 10 of identical configuration may be maintained, and the assembly nut 14 allows the standard replacement roller configuration to cooperate with any of the currently available mounting brackets.

In a preferred embodiment of the present invention, the spacing between the three pairs of faces are respectively 42, 46 and 50 mm. In a preferred embodiment, designed for use with heavy duty idler rollers, the central shaft 20 is approximately 31 mm in diameter, and so the central threaded bore of the nut 14 is sized accordingly so as to thread onto the end of the shaft 20. The flat faces of the nut are each approximately 25 mm in width, which is much wider than the thickness of the typical support bracket 12. This allows a great flexibility of the positioning of the support brackets 12, and the assembly nut may be used with brackets which are considerably misaligned from their ideal positions, without the need for any realignment or adjustment. In addition, the width of the faces of the nut 14 accommodates some axial movement of the roller 10 relative to the conveyor belt supported by it, which helps to minimize stresses between the roller and belt.

Although steel or cast iron is the preferred composition of the assembly nut 14, because of the strength of these materials and the ease of fabrication of the nut therefrom, other materials may be used instead.

From the foregoing, it will be appreciated that the apparatus of the present invention accomplishes the advantages of providing an almost universal adaptation between standard idler rollers and a variety of support brackets, without imposing any critical conditions on the placement or configuration of the brackets. In addition, the desirable feature of preloading the bearing assemblies of the idler rollers is maintained.

It is apparent that various modifications and additions may be made in the apparatus of the present invention without departing from the essential features of novelty thereof, which are intended to be defined and secured by the appended claims.

What is claimed is:

1. A support system for an idler roller mounted on a supporting shaft and maintained in position by a support bracket, comprising in combination; an assembly nut threaded onto an end of said supporting shaft and having a part extending axially outwardly beyond the end of the roller, said extending part comprising three or more pairs of parallel opposing faces spaced apart by a different distance for each pair, whereby the orientation of said nut determines the horizontal distance between faces aligned in vertical planes, said mounting bracket having a slot with side edges adapted to receive in close fitting relationship one of said pairs of faces, to maintain said assembly nut in fixed position relative to said bracket.

2. The mounting system according to claim 1, wherein said parallel faces are angularly spaced around the periphery of said nut, by approximately equal angles.

3. The mounting system according to claim 2, wherein each of said angles is approximately 120°.

4. The mounting system according to claim 3, wherein one said pair is separated by about 42 mm, a second said pair is separated by 46 mm, and a third pair is separated by about 50 mm.

5. The mounting system according to claim 1, wherein each of said faces has a dimension in the axial dimension greater than the thickness of said mounting bracket, whereby said idler roller is free to move axially relative to said bracket.

6. The mounting system according to claim 5, including a retainer plate secured to the exterior end of said assembly nut, and said mounting bracket is located between said idler roller and said retainer plate.

7. The mounting system according to claim 1, including a bearing assembly between said shaft and said roller, said nut having an annular surface at its inner end, and a sleeve surrounding said shaft between said nut and said bearing assembly, and engaging said surface, whereby threading said nut onto said shaft urges said sleeve against said bearing assembly.

8. The mounting system according to claim 7, wherein said bearing assembly comprises a roller bearing, and said bearing is preloaded by force transmitted by said sleeve.

9. For use in a support system incorporating a supporting shaft for supporting an idler roller on a mounting bracket, an assembly nut adapted to be threadably received by said shaft and having an extending part comprising three or more pairs of parallel opposing faces spaced apart by a different distance for each pair, the orientation of said nut determining the horizontal distance between faces aligned in vertical planes, said extending part being adapted to be received in a slot of said mounting bracket with one pair of said faces in close fitting relationship with side walls of said notch.

10. Apparatus according to claim 9, wherein said parallel faces are angularly spaced around the periphery of said nut, by approximately equal angles.

* * * * *